Nov. 16, 1943.  A. B. WELTY  2,334,461
RAKING ATTACHMENT FOR THRESHER CYLINDERS
Filed Nov. 16, 1940
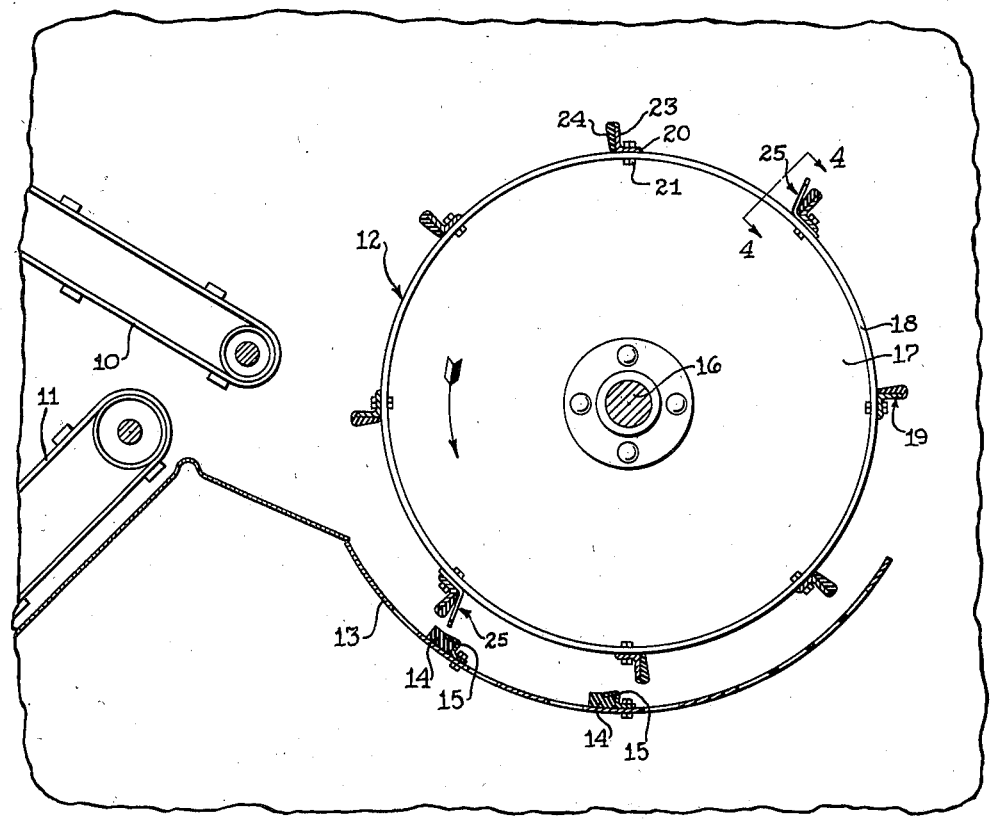
Fig. 1
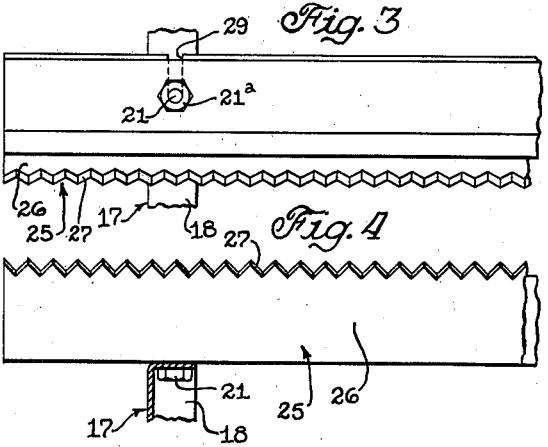
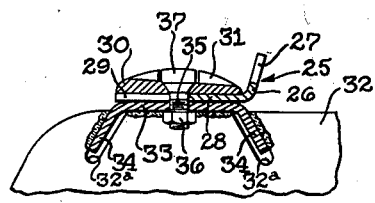
Fig. 5
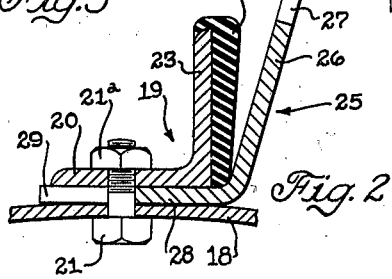
Fig. 2
Inventor
Albert B. Welty
By Paul O. Pippel
Att'y.

Patented Nov. 16, 1943

2,334,461

UNITED STATES PATENT OFFICE 2,334,461

RAKING ATTACHMENT FOR THRESHER CYLINDERS

Albert B. Welty, Moline, Ill., assignor to International Harvester Company, a corporation of New Jersey Application November 16, 1940, Serial No. 365,951

3 Claims. (Cl. 130—27)

This invention relates to a raking attachment for a thresher cylinder.

In some cases, crops fed to a thresher cylinder are of such a nature or in such a mass that they cannot easily be fed between the cylinder and the concave. Accordingly, threshing elements may be required which have a serrated edge by which the crops are raked between the cylinder and the concave. This type of construction is shown in applicant's copending application, Serial No. 310,012, filed December 19, 1939. In the construction of the aforementioned application, the raking means is part of each threshing element and is not detachable therefrom, so that, if threshing elements without a raking action are desired, it is necessary that the elements with the raking action be removed and other elements substituted therefor. By the present application, a raking attachment is provided which is easily attached to and detached from the cylinder without removal of the normal threshing elements.

An object of the present invention is to provide an improved thresher construction.

A further object is the provision of an improved raking attachment for a thresher construction.

Another object is to provide a raking attachment or element which may be easily attached to and detached from a threshing cylinder.

According to the present invention, a raking element is provided which is composed of a pair of angularly related legs, one leg having a serrated edge, the other leg being provided with slots so that the element may be secured to a threshing cylinder by being held between a threshing element normally carried by the cylinder on the cylinder itself with the slots in the leg of the raking element receiving the bolts attaching the threshing element to the cylinder.

In the drawing:

Figure 1 is a sectional view taken through a thresher and showing feeders, a threshing cylinder, and a concave;

Figure 2 is a sectional view, showing in detail the attachment of the novel raking element of the present invention to a threshing cylinder;

Figure 3 is a view showing the attachment of the novel raking element to a threshing cylinder and to a threshing element;

Figure 4 is a sectional view taken along the line 4—4 of Figure 1; and,

Figure 5 is a view similar to Figure 2, but showing a modification of the present invention.

Figure 1 shows a thresher comprising feeders 10 and 11, a threshing cylinder 12, and a concave 13. The concave 13 has a plurality of rubber elements 14 secured thereon by angle elements 15. The threshing cylinder is composed of a plurality of end discs mounted in spaced relation on a shaft 16, only one disc 17 being shown. The discs have a circumferential flange 18, to which a plurality of threshing elements 19 is attached. Each threshing element 19 is formed of an angle bar, of which one leg 20 is in contact with the flanges 18 and has bolts 21 extending therethrough by which the threshing element is secured to the flanges 18, only one bolt being shown. The other leg 23 of each threshing element extends substantially radially outwardly from the discs 17 and has a coating of rubber 24 on its outer side increasing in thickness in a direction away from the flange 18. The elements are what is known as the flail type of bar. The threshing action takes place between the rubber coatings 24 on the elements 19 and the rubber elements 14 secured to the concave 13. Under certain conditions it is desirable to provide the cylinder with one or more raking elements.

According to the present invention, each raking element is formed of an angle bar 25, of which one leg 26 has a serrated edge 27 and the other leg 28 is provided with a plurality of slots 29 extending inwardly from one edge, only one slot being shown. As seen in Figures 1 and 2, a pair of raking elements is mounted at diametrically opposed points on the cylinder 12, and each element is secured to the cylinder with the leg 28 held between the leg 20 of a threshing element with the slots 29 receiving the bolt 21. As is to be seen from Figures 1 and 2, the leg 26 of the raking element extends along the rubber coating 24 of the threshing element and thereby renders it incapable of a threshing action. As previously stated, the raking elements, by virtue of the serrated edges 27, draw in certain crops which are incapable of themselves being otherwise fed between the cylinder and the concave. The attachment of the raking elements 25 to the cylinder is relatively easy. Nuts 21a on the bolts 21, securing diametrically opposed threshing elements 20 to the threshing cylinder, are loosened, and the pair of raking elements are applied to the cylinder as previously stated, the leg 28 fitting between the cylinder and the threshing elements and the slots 29 receiving the bolts 21. The nuts 21a are then tightened to hold the threshing and raking elements in place. When the raking elements are to be removed, the nuts 21a are loosened and the raking elements are slid out of place, the nuts 21a are tightened so that the threshing elements are again held against the flanges 18 of the discs 17 comprising the threshing cylinder. The advantage to the arrangement just described is that the raking elements may be easily attached and detached and removal of the threshing elements is unnecessary.

Figure 5 shows the novel raking element 25 applied to a threshing element of the rasp-bar type. This threshing element 30 comprises a plurality of transversely extending ribs 31, of which only one is shown. The threshing element 30 is attached to the type of threshing cylinder such as shown in the copending application, Serial No. 357,919, filed September 23, 1940, composed of a plurality of discs 32 of polygonal shape, only one being shown. A channel member 33 has its legs 34 inserted in slots 32a in the discs 32, being welded or soldered thereto, as shown. The base of the channel member 33 serves as a securing means for the threshing element 30, bolts 35 and nuts 36 holding the element 30 on the channel member, only one bolt and nut being shown. Each bolt has a flattened head 27 which fits into a slot in one of the transversely extending ribs 31, the head being of the width of a rib.

A raking element is secured to the channel member 33 forming the modification of the threshing cylinder, in the same way as in the modification of Figure 1. A leg 28 of the raking element is held between the base of the channel member 33 and the threshing element 29 with the bolts 35 being received in slots 29 in the leg 28. The raking element used in this modification differs from that used in Figure 1 in that the leg 26, having a serrated edge 27, is longer in the former than in the latter.

It will be apparent that a new and novel raking construction has been provided for a thresher cylinder which embodies raking elements securable to the cylinder by being held between certain of the threshing elements and the cylinder. They are so constructed that they may be attached without removal of the threshing elements.

The intention is to limit the invention only within the scope of the appended claims.

What is claimed is:

1. The combination with a threshing cylinder, a threshing element, and a member passing from the cylinder to the element for securing them together, of a raking element having a serrated portion and a portion having a slot extending from one edge, the latter portion being held between the cylinder and the threshing element with the member connecting them extending through the slot in the raking element.

2. The combination with a threshing cylinder, a threshing element formed of a first leg providing a threshing surface and a second leg extending at a substantial angle to the first leg, and a member extending between the cylinder and the second leg of the threshing element, of a raking element formed of a first leg having a serrated edge and a second leg having a slot extending from one edge, the second leg being held between the threshing cylinder and the second leg of the threshing element with the slot in the second leg of the raking element receiving the member extending between the cylinder and the second leg of the threshing element, the first leg of the raking element extending outwardly along the outer side of the first leg of the threshing element.

3. The combination with a threshing cylinder, a threshing element formed of a first leg providing a threshing surface and a second leg extending at a substantial angle to the first leg, and attaching means connecting the cylinder and the second leg of the threshing element, of a raking element formed of a first leg having a serrated edge and a second leg having an attaching portion, the second leg being held between the threshing cylinder and the second leg of the threshing element with the attaching portion in the second leg of the raking element cooperating with the attaching means connecting the cylinder and the second leg of the threshing element, the first leg of the raking element extending outwardly along the outer side of the first leg of the threshing element.

ALBERT B. WELTY.